Sept. 17, 1940.  C. A. YOUNG  2,215,203
MOTOR VEHICLE HEADLIGHT
Filed Dec. 13, 1938
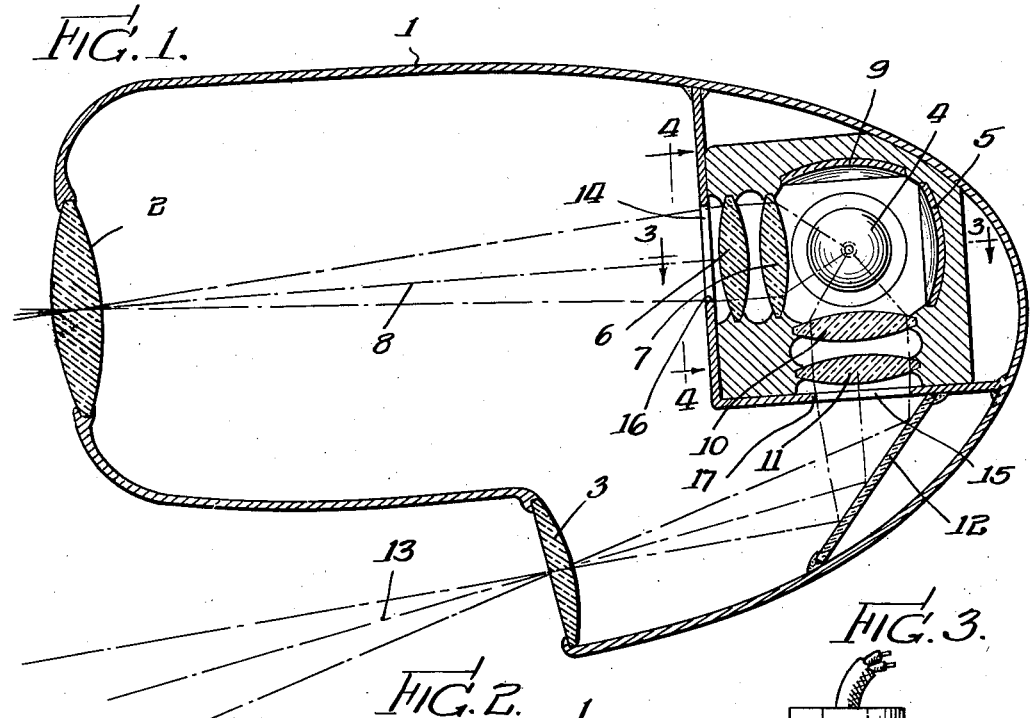
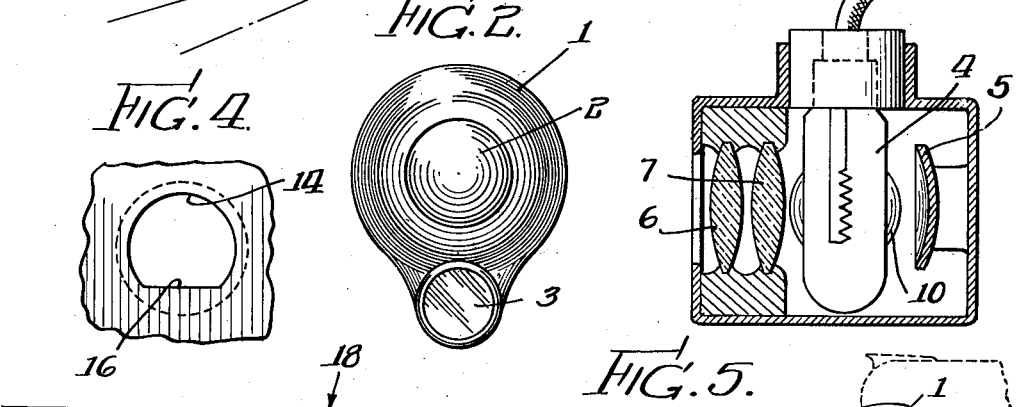
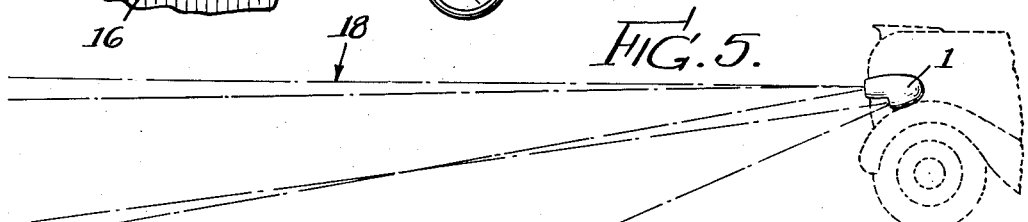
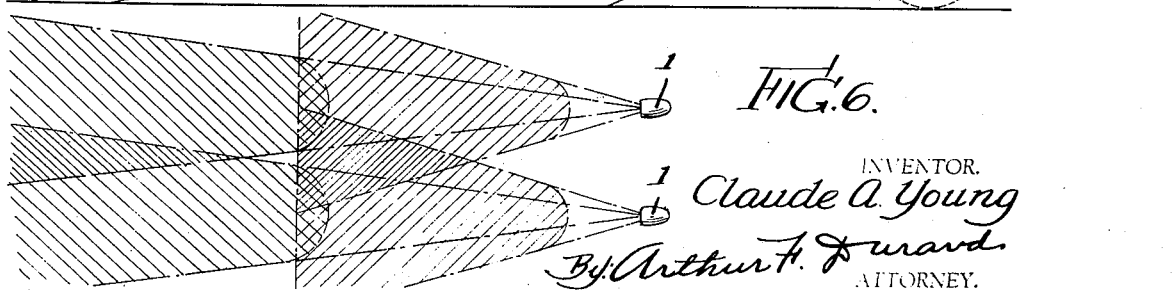
INVENTOR.
Claude A. Young
By Arthur F. Durand
ATTORNEY.

Patented Sept. 17, 1940

2,215,203

UNITED STATES PATENT OFFICE 2,215,203

MOTOR VEHICLE HEADLIGHT

Claude A. Young, Berwyn, Ill.

Application December 13, 1938, Serial No. 245,426

3 Claims. (Cl. 240—41.3)

This invention relates to headlights, and more particularly to those used on motor vehicles.

Generally stated, it is the object of the invention to provide a novel and improved construction and arrangement whereby the headlight is provided with a long range projector, for directing a beam of light some distance ahead of the vehicle, for the primary illumination of the road, and is also provided with a short range projector directing a beam of light against the paving immediately under the said long range beam of light, providing a secondary illumination in rear of said primary illumination, so that the problems of long range and short range projection are not imposed on just a single projector, but to the contrary are divided between two separate projectors, but using only a single lamp, and whereby all of the rays of light are kept below a horizontal line which is some distance below the plane of the eyes of drivers of other vehicles.

It is also an object to provide certain details and novel features of construction and combinations tending to increase the general efficency and desirability of a vehicle headlight of this particular character.

To the foregoing and other useful ends, the invention consists in matters hereinafter set forth and claimed and shown in the accompanying drawing, in which—

Fig. 1 is a longitudinal section of a headlight embodying the principles of the invention.

Fig. 2 is a front elevation of said headlight, on a smaller scale.

Fig. 3 is a fragmentary sectional view looking downward, on line 3—3 in Fig. 1 of the drawing.

Fig. 4 is a fragmentary view on line 4—4 in Fig. 1 of the drawing, looking in the direction of the arrows of this line.

Fig. 5 is a diagrammatic view, in the nature of a side elevation, showing the manner in which the two projectors of the headlight throw the two beams of light on the paving in front of the vehicle.

Fig. 6 is a similar diagram, in the nature of a plan view, showing the use of two headlights of the kind shown and described, and illustrating how the two beams of each headlight overlap to some extent with the beams of the other headlight.

As thus illustrated, the invention comprises a housing or casing 1, preferably of metal, and made in any suitable or desired manner, with the view to easily assembling the different parts therein. In the front end of said casing, there is a lens 2, and set back a distance from said lens is a supplemental lens 3, so that two beams of light are thrown on the paving ahead of the vehicle, one a long range beam, through the projector lens 2, and the other a short range beam, so to speak, through the projector lens 3 below.

Within the said housing, there is a suitable electric lamp 4, mounted in any suitable or desired manner, between the concave mirror 5, and the two lenses 6 and 7, so that these two lenses are between the lamp and the main projector lens 2, previously described. It will be seen that the axis 8 of this main projector is tilted slightly downwardly, so that the top of this beam of light is kept below a horizontal line disposed a substantial distance below the plane of the eyes of the drivers of other vehicles, so that this long range projector will not prouce any glare in the eyes of said drivers.

It will also be seen that said lamp 4 is between an upper concave mirror 9 and two lenses 10 and 11 below, whereby these lenses are between the lamp and the mirror 12, which latter is disposed at a proper angle to deflect the rays of light through the supplemental projector lens 3, previously described. It will be seen that the axis 13 of this supplemental or short range beam of light is also tilted downwardly, so that the short range beam is practically entirely below the long range beam, as shown in Fig. 5 of the drawing.

If desired, the openings 14 and 15, through which the two beams are directed, may have straight edges 16 and 17, whereby the front ends of the illuminated spots on the road or paving will be more or less transverse of the latter, thus tending to insure a uniform illumination of the paving for some distance ahead of the vehicle, to a point where the illumination terminates substantially along a transverse line on the road or paving, for each beam of light—that is to say, for both the long range projection and the short range projection as well.

To keep the light below the said horizontal plane, and thus a substantial distance below the plane of the eyes of the drivers, it will be seen that practically all of the lenses, and the mirrors therefor, are tilted forward a distance, and this is preferably accomplished by a tilted construction of the lamp structure itself, so that the separate beams of light will be directed downwardly against the road or paving, in the desired manner.

Looking at Fig. 6 of the drawing, it will be seen that the two short range beams of light, from the lower projectors of the two lamps 1 and 1, overlap each other, to some extent, and that this is also true of the two long range beams of light from the upper projectors of the two lamps. This means, therefore, that the road or paving is flooded with light, at full power, or to any desired degree of intensity, for a considerable distance ahead of the vehicle, practically uniformly, in a manner to enable the driver of the car having these two lamps to clearly see the road for some distance ahead. At the same time, however, as stated, drivers coming from the opposite direction will not be blinded by the glare of the two lamps 1 and 1, as the rays of light from the latter, by the forwardly tilted construction of the elements of the two lamps, are held down and kept below a horizontal line 18, which latter is located a substantial distance below the plane of the eyes of all drivers on the road or highway, taking into account the heights of different drivers, and the different vehicles.

While double convex lenses are shown, at certain points, it is obvious that these lenses may be of any suitable or desired character. It is also obvious that the lens 3, while shown as having only one convex side, may also be of any desired character, without departing from the spirit of the invention.

Thus, with the construction shown and described, which is illustrative of one form of the invention, there is efficient use of the light produced by the electric lamp bulb, and the problems of long range and short range projection, in order to flood the road or paving with light practically immediately in front of the vehicle, to a point some distance ahead, are divided between upper and lower projectors, instead of being imposed on one single projector, and hence the problem of flooding the road or paving with light is simplified and rendered more satisfactory. But it will be understood, of course, that by suitable construction of the long range projector, the separate short range projector could be omitted, but that would involve some different optical problems, obviously, and hence the preferred construction is to divide the short range projection from the long range projection, by using two separate projectors in the manner shown and described.

Moreover, it will be seen that the front lens 2 (and this may also be true of the lens 3) will be visible to drivers coming from the opposite direction, as these lenses will be illuminated, thus indicating the position of the front end of the car on which this lamp is carried, but at the same time there will be no glare from this lens.

It will be seen that the openings on which the edges 16 and 17 are formed, are round, except for said straight edges, and that these openings serve to prevent the formation of color rings around the edges or marginal portions of the area of light on the paving or road, in the manner well known to optical science. Moreover, it will be seen that both mirrors 5 and 9 could be simply the polished surface of the casing, as by making the latter of a metal that would take a high polish to serve as a mirror.

Again, it will be seen that the single lamp 4 is sufficient for both projectors, and furnishes all the light. Of course, the outer lamp casing 1 in its entirety can be mounted at any desired angle, in a downward direction, or the two lamps can be skewed laterally, and by such relative adjustment of the two lamps, the beams of light on the paving or road can be made to overlap, more or less, or they can be prevented from overlapping to any extent whatever. This is all obvious, and does not need any further explanation.

It will be seen, therefore, that the invention contemplates a horizontally disposed electric lamp in the rear portion of a casing, with means for taking and directing rays from the front side of this lamp to provide a primary or major illumination of the road ahead of the vehicle, in combination with means for taking and directing light rays from the under side of said lamp to produce a secondary or minor illumination in rear of said primary illumination, with reflectors facing the upper and rear sides of said lamp, whereby the light rays from all four sides of the lamp are utilized for the said primary and secondary illumination of the road, the secondary illumination being immediately in front of the vehicle and substantially in rear of the said primary illumination, all in a headlight having only a single electric lamp.

What I claim as my invention is:

1. A motor vehicle headlight comprising a casing of opaque material, a first light refractor means at the front end of said casing, for the major and primary long range illumination of the road, a second light refractor means on the under side of said casing, set back a substantial distance from said first refractor means for the secondary and short range illumination of the road immediately behind said major illumination, and lighting means in said housing to direct both direct and reflected light directly through the first refractor means and to direct only reflected light indirectly through the second refractor means, said lighting means comprising an electric light bulb extending horizontally and transversely of the vehicle, with lens means between said bulb and said first refractor means, and with both lens and reflecting means between the lower side of the bulb and said second refractor means.

2. A structure as specified in claim 1, comprising a reflector behind said bulb and a reflector above said bulb, each said lens means comprising a pair of double convex lenses.

3. A structure as specified in claim 1, said first refractor means comprising a single double convex lens, and said second refractor means comprising a single lens flat on its outer surface and convex on its inner surface, each refractor means being disposed in a forwardly tilted vertically disposed plane, but the plane of the second refractor means being tilted more than the other plane.

CLAUDE A. YOUNG.